Figure 1:

United States Patent

[11] 3,585,381

[72] Inventors Theodore L. Hodson
 Bellbrook;
 James V. Cartmell, Dayton; Donald
 Churchill, Kettering; Joe W. Jones, Dayton,
 all of, Ohio
[21] Appl. No. 815,662
[22] Filed Apr. 14, 1969
[45] Patented June 15, 1971
[73] Assignee The National Cash Register Company
 Dayton, Ohio

[54] ENCAPSULATED CHOLESTERIC LIQUID
 CRYSTAL DISPLAY DEVICE
 15 Claims, 3 Drawing Figs.
[52] U.S. Cl. ................................................. 250/47,
 117/69, 161/410, 250/83, 252/408, 350/160
[51] Int. Cl. ............................................... G01b 21/00
[50] Field of Search ......................................... 250/65.1,
 83, 47; 117/69; 252/408; 161/6, 410; 106/21;
 350/160 LC; 23/230 LC

[56] References Cited
 UNITED STATES PATENTS
 3,265,630 8/1966 Jensen ........................... 252/316
 3,351,948 11/1967 Bonn ............................. 250/65.1 X
 3,401,262 9/1968 Fergason et al. ............... 250/83

Primary Examiner—James W. Lawrence
Assistant Examiner—A. L. Birch
Attorneys—E. Frank McKinney and Joseph P. Burke ABSTRACT: The present disclosure is directed to articles of manufacture, e.g., display devices, having an encapsulated liquid-crystal member of enhanced color purity, color contrast and visual resolution due to an overlying essentially transparent top layer having a substantially smooth exterior surface. This essentially transparent layer has an index of refraction which approximates that of the capsule cell wall material and any polymeric or other binder used in conjunction with the encapsulated liquid crystals in the encapsulated liquid crystal layer or member.

PATENTED JUN15 1971   3,585,381

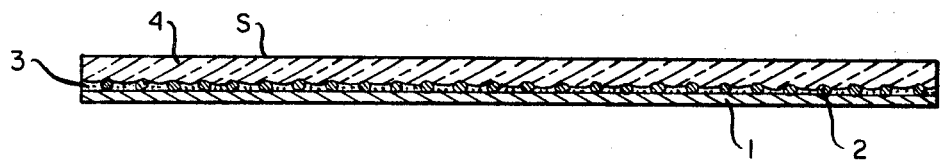

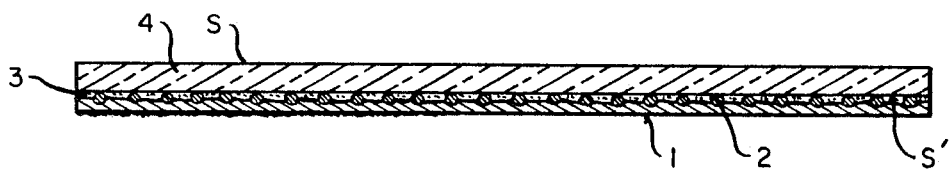

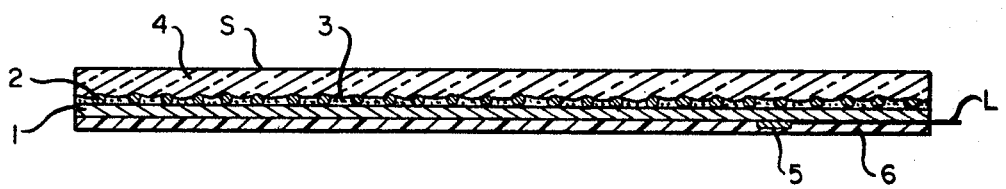
INVENTORS
THEODORE L. HODSON
JAMES V. CARTMELL
DONALD CHURCHILL &
JOE W. JONES
BY *E. Frank McKinney*
*Joseph P. Burke*
THEIR ATTORNEYS

ENCAPSULATED CHOLESTERIC LIQUID CRYSTAL DISPLAY DEVICE

Prior to the present invention, the color-change behavior of liquid crystals, esp., those of the cholesteric type, when subjected to the stimulus of heat or an electric field was known. Of course, the exact color changes and the level of thermal energy or electric field input required to effect a given color change are dependent upon the specific liquid crystal composition selected. The ability of cholesteric liquid crystals, per se, to undergo such thermal changes suggests their use in thermal imaging and display devices, e.g., as noted in U.S. Pat. Nos. 3,114,386, 3,401,262 and 3,410,999. The same may be said of their known color response when an electric field is imposed on the liquid crystals.

While such phenomena were interesting and theoretically capable of utilization in thermal imaging and other data display applications, several vexatious problems attended the use of coating compositions containing unencapsulated cholesteric liquid crystals. The liquid crystal is characteristically a viscous liquid and films are easily damaged or removed by contact. In addition, atmospheric dust and other airborne particles (present in normal concentrations) adhere to the film causing a deterioration in the color-scattering properties. Also, there is a critical relation between the compositional purity of the material and the ability to reproduce colors within a well-defined temperature range. Absorption of certain organic vapors in very small concentrations can alter the color-temperature relation. In some liquid crystal compositions certain constituents are prone to crystallize and in so doing, the material balance is altered by zone refining. This results in films of nonuniform color. All of these factors limit the useful like of the liquid crystal film.

A significant improvement enabling the more practical utilization of liquid crystals occurred when it was discovered that liquid crystals, esp. those of the cholesteric type, could be protected from such degradative influences by encapsulation, without detracting from the ability to coat or otherwise apply liquid crystals in any manner which they could previously be used. Hence, their usable life was greatly increased without in any way narrowing the flexibility in use. The encapsulation of cholesteric liquid crystals is the subject of U.S. Pat. application Ser. No. 618,751 filed in the names of Donald Churchill, James V. Cartmell and Robert E. Miller on Feb. 27, 1967. Similar subject matter is found in French Pat. specification No. 1,527,432 and South African Pat. specification No. 3016/67.

The encapsulation of such liquid crystals greatly enhanced the practicality of using liquid crystals to monitor temperature changes, for data display devices, etc. However, the encapsulated liquid crystals, when applied in a suitable manner, viz., in the form of a coating with or without additional binder, has a duller visually observed color effect and a reduced visual contrast upon subjection to thermal or electric field stimulus compared to freshly prepared unencapsulated liquid crystal material of identical composition. In short, the encapsulated liquid crystals had diminished color purity, and the color produced was not sufficiently distinguishable from the background unstimulated regions to satisfy aesthetic requirements for display devices. Also, it was observed that the angular dependency of color was less with encapsulated liquid crystals than unencapsulated liquid crystals of the same composition. These problems of reduced color purity and contrast are largely overcome by utilization of the structure of the present invention which involves an essentially transparent, substantially smooth (on the viewing, usually upper, surface) layer which is in direct contact with the layer containing the encapsulated liquid crystals, said transparent smooth-surfaced layer having an index of refraction which is close to that of the materials employed as the capsule cell wall and the binder used in the encapsulated liquid crystal layer.

It was surprising that the utilization of such a transparent, smooth-surfaced viewing layer would improve the color purity and color contrast of the encapsulated liquid crystals. While said layer also provides additional protection for the liquid crystals, e.g., from dust, moisture, etc.; its use as a protective layer would not be justified from a practical point of view because the cell wall introduced by encapsulation performs this function of protecting the identity and integrity of the liquid crystal composition adequately. Also, the use of a binder assists in locating and evenly distributing the encapsulated liquid crystals on the substrate. Furthermore, it was not apparent that by putting more of a transparent barrier between the liquid crystal, per se, and the viewer (that is in addition to the capsule cell wall and binder) that the color purity, brightness and color contrast could be significantly upgraded. Quite surprisingly, however, the utilization of the transparent, smooth-surfaced layer in direct contact with the encapsulated liquid crystal layer throughout substantially the entire extent or surface thereof let to significant improvements in color purity, contrast and visual resolution compared to the previous encapsulated liquid crystal-containing display articles. Also, it was observed that the angular dependency of color of the encapsulated liquid crystal articles having a brightness improving top layer was greater than that of such articles having no top layer. The present invention overcomes the chief drawbacks previously associated with the use of encapsulated liquid crystal display films.

From one facet the present invention can be viewed as a structural improvement wherein an essentially transparent surface (top) layer having a substantially smooth exterior surface is in direct contact at its interior (innermost) surface with an encapsulated liquid crystal layer (which can have an opaque background) throughout substantially the entire extent of said encapsulated liquid crystal layer and in which the index of refraction of said top layer, the capsule cell wall and any binder present in the encapsulated liquid crystal layer lies within the range of from about 1.40 to about 1.70. Both the exterior (closer to viewing agency) and interior major surfaces of said top layer can be smooth and the best brightness is apparently secured when both said surfaces are smooth.

The term "smooth" as used herein means that the average ratio of the horizontal distances or lengths (L) between crests (high points) on the outermost (exterior) surface divided by the vertical distance (D) between said crests and troughs (low points) on the outermost surface is at least 4.0, viz., $L/D = 4.0+$. When the articles of this invention are formed by topcoating procedures, some of the crests can be the tops of capsules which protrude through the polymer topcoat whereas other crests can be the polymer topcoat as it overlies capsules lying underneath. Usually, the depth of surface irregularities is small in comparison to the size (diameter) of the capsules, and the undulations are generally continuously variable rather than sharply discontinuous, e.g., as is experienced when no top layer is present such as occurs when a capsular layer (encapsulated liquid crystals plus binder) is the outermost surface.

Figure 2:
Figure 3:

Three embodiments illustrating the present invention are shown in the drawings. FIGS. 1 to 3 are cross-sectional views showing composite display film structures utilizing the improved features of the present invention.

In FIG. 1 there is shown an opaque, e.g., black, background layer, 1, which can be a preformed opaque film or a substrate film having a black coating, e.g., ink, on its upper or lower surface. The opaque film, 1, has on its upper surface an overlying layer formed of a plurality and more accurately a profusion of individual encapsulated liquid crystals, 2, (or clusters of such individual encapsulated liquid crystals) located in association with a polymeric binder, 3, which assists in retaining the capsules in substantially uniform distribution on the opaque substrate. The essentially transparent top layer, 4, overlies and is in direct contact with the encapsulated liquid crystal layer throughout substantially its entire extent and has a smooth outer viewing (upper) surface, S, as illustrated in FIG. 1. The article of FIG. 1 can be made conveniently by applying an emulsion coating of encapsulated liquid crystals and binder to a paper or plastic substrate, e.g., Mylar, previously painted black. When the encapsulated liquid crystal layer has fully dried, a transparent polymer topcoat 4, having an essentially smooth upper surface can then be applied thereto. While FIGS. 1 and 3 show outermost surface S of top layer 4 to be quite flat, it will be realized that the top coating procedure will result in some undulations as the top coating tends to assume in part the contours of the underlying capsules. These surfaces are "smooth" however, as defined above. When the top layer is formed by topcoating, the underlying substrate can be paper, wood or any nontransparent material, such as metal foil, e.g., aluminum foil; plastic, e.g., poly(tetrafluoroethylene) "Teflon," etc.

In the article shown in FIG. 2 the encapsulated liquid crystal-binder is applied as a slurry or emulsion by coating onto a sheet or layer, 4, of transparent material, e.g., organic plastic, e.g., polyacrylate or silicone polymer, or inorganic material, e.g., glass. Top layer, 4, is smooth on both its upper (exterior) and lower (interior) surfaces, S and S', respectively, and is of substantially the same thickness throughout. This structure can be secured readily by use of preformed sheets, e.g., of polished plate glass or plastic having substantially smooth surfaces. In the case of the FIG. 2 device, the transparent smooth top layer, 4, is inverse coated (on surface, S',) with the encapsulated liquid crystal-binder composition and the coating is allowed to dry thoroughly. Surface S', then becomes the interface between glass or plastic and encapsulated liquid crystals. Then this encapsulated liquid crystal layer is overcoated with a black or other opaque coating, 1, to aid in viewing the color change by incident light upon thermal and/or electric field stimulus. The thus formed device (article) is then inverted for viewing through transparent layer, 4, as shown in FIG. 2. The exterior (lower) surface of background layer, 1, can be either smooth or uneven as the case may be since it has nothing to do with the visual contrast and optical purity of the image observed through the transparent smooth surface layer 4.

The article of FIG. 3 is formed by topcoating and hence is like that of FIG. 1, but it additional includes one or more electrically conductive resistor heater element(s), 5, deposited on substrate 1 or at least positioned in thermally responsive communication with encapsulated liquid crystals 2, e.g., by conduction, convection or radiation. Electric lead(s), L, can be connected to a source of current, not shown. Optionally, there can also be included a base or insulating substrate 6.

While it will be observed that in all cases as shown in the drawings, the top layer and encapsulated liquid crystal layer are separate and distinct; the encapsulated liquid crystal layer can be deposited in any desired configuration or design both linear and nonlinear (curved), e.g., by stenciling, silk screening, gravure roll printing, etc. Hence, when it is stated that the smooth top layer is in direct contact with the encapsulated liquid crystal layer throughout substantially the entire extent thereof, this can mean only a portion of the entire upper surface of the display, viz., the encapsulated liquid crystal printed portion. Polychromatic displays can be attained by use of different mixtures of liquid crystals coated in one or more layers on different areas of the encapsulated liquid crystal layer. Some areas can be coated in an overlapped manner with a plurality of different encapsulated liquid crystal compositions to aid in obtaining color effects not readily obtainable by use of a single encapsulated liquid crystal composition. Of course, the utilization of encapsulated liquid crystals enables different liquid crystal compositions (yielding various colors at the same temperature) and printed configurations thereof to be used in positionally close association in various regions of the same display article without destroying the compositional integrity of each composition.

The improved structures of this invention can be employed wherever encapsulated liquid crystals are utilized in order to enhance the color contrast and purity of the color visually observed due to the presence of the encapsulated liquid crystals. Thus, its use is equally feasible in the case of both electric field effect and thermal detection or display devices (e.g., where the heat is generated due to electrical resistors such as at 5 in FIG. 3).

As previously noted, the index of refraction of the smooth-surfaced, transparent top layer is usually close to that of the material employed to form the capsule cell wall and also that of the polymer or other material employed to serve as binder in the encapsulated liquid crystal layer. Usually the index of refraction of the top layer, binder and cell wall ranges from about 1.40 to about 1.70. More usually, the index of refraction of the top layer ranges from about 1.45 to about 1.60, preferably from about 1.48 to 1.59 and more preferably between about 1.50 and 1.54.

When the top layer is plastic, it can be produced from a wide variety of essentially transparent natural and synthetic organic materials, such as polyolefins, e.g., polyethylene, polypropylene, polybutylenes; polyesters, e.g., polyethylene glycol terephthalate; acrylic resins, e.g., polyalkyl acrylates and methacrylates, such as polymethylacrylate, polyethylacrylate, polymethylmethacrylate, polybutylmethacrylate, polystyrene; polyvinylidene chloride homo- and copolymers e.g., "Saran" materials, nylons and other polyamides; polyvinyl aldehydes, e.g., polyvinyl formaldehyde, polyvinyl butyraldehyde; copolymers of mono-olefinically unsaturated monomers with vinyl esters, such as ethylene-vinyl acetate copolymers; cellulosic plastics, e.g., cellulose acetate, ethyl cellulose; polycarbonates; polyurethanes; silicone resins, polyalkyl siloxanes, e.g., polymethyl siloxane; alkyd resins and varnishes, and other polymers and resins.

Under certain circumstances it is preferable to employ a polymer which can be deposited, e.g., cast from an organic, water-immiscible solvent since the presence of water could partially dissolve the capsular cell wall and impair the quality thereof, viz., with respect to the encapsulated cholesteric liquid crystal member. In any event, when depositing the transparent, smooth-surface film, 4, while employing water or a water-miscible solvent; care should be exercised to avoid exposure of the capsules for extended periods of time to a solvent which is also a solvent for a capsule wall material.

While organic plastic materials, e.g., polymeric materials, have been mentioned hereinabove for use in conjunction with the transparent, smooth-surfaced top layer 4, other materials, e.g., inorganic materials such as glass (e.g., conventional soda-lime-silica glasses), alkali metal silicates such as sodium silicate, potassium silicate, etc., can be employed.

Instead of forming the top layer by overcoating the encapsulated liquid crystal layer (as shown in FIGS. 1 and 3); preformed films, layers or sheets of organic or inorganic material can be used via inverse coating to constitute top layer 4, e.g., as noted in conjunction with the description of the article of FIG. 2. The thickness of the top layer 4 can be varied widely from approximately 10 microns to one-eighth inch or greater, esp., in the case of glass sheets of polished plate glass where a one-eighth inch thickness has been utilized quite satisfactorily.

LIQUID CRYSTAL MATERIALS

The term "liquid crystal," as used herein, is employed in the generic, art-recognized sense to means the state of matter often referred to as a mesophase, wherein the material exhibits flow properties associated with a liquid state but demonstrates long range ordering characteristics of a crystal. The term "cholesteric liquid crystal" refers to a particular type of mesophase most often demonstrated by esters of cholesterol. Many of the cholesteric liquid crystals exhibit a reflective scattering of light giving them an iridescent appearance. In addition to using individual liquid crystal compounds, the encapsulated cholesteric liquid crystalline layer can be and usually is comprised of a mixture of two or more such compounds. The encapsulated cholesteric liquid crystal layer, itself, can be composed of a plurality (and usually a profusion) of capsules containing the same or different cholesteric liquid crystal composition. Suitable individual cholesteric liquid crystal materials and mixtures which exhibit chromatic response to varying temperatures include, but are not limited to, the following: cholesteryl nonanoate, cholesteryl chloride; cholesteryl nonanoate and cholesteryl bromide; cholesteryl nonanoate, cholesteryl bromide and cholesteryl cinnamate; cholesteryl nonanoate, cholesteryl iodide and cholesteryl cinnamate; cholesteryl nonanoate, cholesteryl iodide and cholesteryl benzoate; cholesteryl nonanoate, cholesteryl chloride and oleyl cholesteryl carbonate; cholesteryl nonanoate, cholesteryl chloride and oleyl cholesteryl carbonate and cholesteryl bromide; oleyl cholesteryl carbonate and cholesteryl iodide, oleyl cholesteryl carbonate and cholesteryl p-chlorobenzoate; etc.

Also, it should be understood that included within the term cholesteric liquid crystalline mixtures are mixtures of two or more individual materials, one or more of which individually does not form a cholesteric liquid crystal phase but which in admixture exhibit a cholesteric liquid crystal phase. Hence, one or more materials which individually are not cholesteric liquid crystals can be employed in accordance with this invention if, when in admixture, they do exhibit cholesteric liquid crystal behavior, viz., they form a mesophase which demonstrates the property of reflection (light scattering). One such mixture is cholesteryl nonanoate, oleyl cholesteryl carbonate and cholesterol. The latter material, by itself, does not form a cholesteric liquid crystalline phase; but cholesterol does form a chromatically responsive mesophase in combination with the other materials.

Various natural and synthetic polymeric materials can be employed to constitute the polymeric binder matrix of the encapsulated cholesteric liquid crystal layer. Any transparent or substantially transparent polymeric material having an index of refraction in the range set forth hereinabove can be used. Suitable polymeric materials for this purpose include, but are not limited to, the following: acrylates, polyalkyl acrylates and methacrylates, e.g., polymethyl acrylate, polyethyl acrylate, polymethyl methacrylate, etc.; polyvinyl alcohol, gelatin, latex (natural rubber and synthetic rubber latexes), zein, polyethylene homo- and copolymers, polypropylene homo and copolymers; and any of the materials mentioned above as suitable top layer materials. The encapsulated cholesteric liquid crystals can be associated intimately with the polymer matrix in a variety of ways. For example, the capsules can be deposited onto a polymer film, e.g., as a coating simply by spraying from a dispersion or emulsion of the encapsulated liquid crystal in a binder.

ENCAPSULATION PROCEDURES

A wide variety of procedures can be employed to adequately prepare capsules and liquid crystalline layers containing the encapsulated liquid crystals. The capsule diameters can vary from about 2 to about 1,000 microns or more, but usually capsule diameters range in size from about 5 to about 500 microns and preferably from about 15 to 30 microns. The 20 to 25 microns size capsules are more preferred due to their uniform coatability, color properties and resolution characteristics. One satisfactory method of preparing capsules suitable for containing liquid crystal materials is disclosed in U.S. Pat. No. 2,800,457 issued on July 23, 1957, to Barrett K. Green and Lowell Schleicher. While the aforementioned capsule preparation system is sometimes preferred, it should be understood that the capsule products employed in this invention can be obtained by any of the many later-developed encapsulation procedures which are capable of producing capsules of the dimensions required for a given use. The final form of the capsular material to be coated is preferably 20 to 25 micron capsules; but it has been found that virtually any size of capsules can be successfully utilized, the larger capsules showing a somewhat decreased extent of visual resolution when used, e.g., in a data display system. While U.S. Pat. No. 2,800,457 discloses a pioneer invention concerning encapsulation on a minute scale, reference is also made to application for U.S. Pat. Ser. No. 591,023, filed Oct. 31, 1966, which is a continuation of U.S. Pat. application Ser. No. 137,992, filed Sept. 14, 1961, by Carl Brynko et al., which application discloses a procedure for making larger than microscopic capsules. This same procedure is also discussed in the corresponding British Pat. No. 935,312. While the foregoing encapsulation procedures are chemical in nature, it should be realized that mechanical encapsulation procedures (as well as other chemical procedures) can be used to make the liquid crystal capsules. Further details concerning satisfactory procedures can be obtained in *"Microencapsulation"* by Anderson et al., published by Management Reports, Boston, Mass. (1963), the entire disclosure of which is incorporated herein by reference.

Another feature of the incorporation of encapsulated cholesteric liquid crystalline materials into a sensing or display system is the utilization of a mixture of capsules, as to size and content, for indicating and/or displaying a wide range of specific levels of temperature. Such a system, in one case, can comprise a plurality of layers, or areas in the same layer, each comprising one, two or more types of capsules having different mixtures of chromatically responsive cholesteric liquid crystalline materials. These devices can be tailor-made to accomplish a desired task by adjustment of characteristics imparted thereto by any one or more of the following variables: (a) temperature response range of the encapsulated liquid crystal material used; (b) size of the liquid crystal core; (c) type and thickness of the capsule cell wall material; (d) specific composition of the liquid crystalline material, and the like, all to the purpose of choosing a response suitable for a given proposed use or product.

In accordance with this invention capsules can be prepared which contain from about 50 to about 99 weight percent of internal phase payload (cholesteric liquid crystal material) with the remainder being cell wall material. Usually, however, the internal phase represents from about 70 to about 95 weight percent of the total capsule weight.

It is also within the purview of this invention to employ a coloring material to tint the capsule cell wall color. The capsule cell walls thus colored would serve not only as liquid crystal containers but also as color filters for the light traveling to and from the encapsulated cholesteric liquid crystalling materials. Capsule cell walls are easily tinted by any stain capable of coloring the gelatin-gum arabic or other cell wall material selected for use. Such a controlled system would find use in display devices and other devices where the broad spectrum iridescent effect (that obtained from the incident light emanating from the encapsulated cholesteric liquid crystalline member) is objectionable for certain uses.

A wide variety of encapsulating (external phase) materials can be employed to encapsulate the cholesteric liquid crystals in accordance with this invention. Such suitable materials include those referred to hereinabove in said U.S. Patents, patent applications, said British Patent and the *Microencapsulation* report. Usually the encapsulating material is one or a combination of the following: a gelatin-gum arabic system, a polyvinyl alcohol-based system, a zein-based system, or phenol-plast or amino-plast condensates, e.g., resorcinol-formaldehyde, urea-formaldehyde-based systems, etc.

The advantages in color purity (optical spectral purity) and contrast attainable by the present invention are evident in the following detailed examples, which are included herein to illustrate rather than to limit the invention. All percents and parts are by weight unless noted otherwise.

EXAMPLE 1 (TOPCOATING)

The advantages attainable by the present invention were illustrated by preparation of two comparative typical forms of display devices. One utilized the transparent, smooth-surfaced top layer in accordance with this invention whereas the other had no such top layer structure. Both forms of display devices utilized the same electroconductive resistive elements to generate heat and were operated in the same way as thermal mode display devices.

Thin-film tantalum-resistive elements were deposited onto a glass substrate by vacuum deposition in conventional manner. The substrate (with resistors) was then coated with an opaque black paint to aid in observing the liquid crystals upon heating. A film of encapsulated liquid crystals with a polyvinyl alcohol binder was then coated over the black film. The encapsulated cholesteric liquid crystal layer was formulated (as specified below) to have a comparatively low color-temperature response, i.e., the scattered color being the same over a fairly wide range of temperature. The capsule layer of the article prepared in accordance with this invention was then overcoated with a transparent acrylic polymer, whereas the comparison article (control) received no top layer.

In operation, the resistive elements were heated by an electric current from a 20-volt potential source and those regions of the encapsulated liquid crystal layer overlying the resistive elements were heated to the isotropic state which is transparent. At this point the black background undercoat becomes visible to yield a black image on a green colored substrate.

A liquid crystal mixture of 70 weight percent cholesteryl nonanoate, 25 weight percent cholesteryl chloride and 5 weight percent cholesteryl cinnamate was prepared and encapsulated in conventional manner using a standard two-way gelatin coacervation system. The encapsulation was conducted specifically as follows: into an aqueous solution of 1 weight part of acid-extracted pigskin gelatin (having a Bloom strength of 285 to 305 grams and an isoelectric point of pH 8 to 9) in 12.1 weight parts of distilled water at 55° C. there were placed 13.7 weight parts of said liquid crystal melt. The liquid crystal melt was milled with a shear agitator until the desired particle size was achieved, viz., from 15 to 30 microns. While the milling progressed, an aqueous solution of 1 weight part of gum arabic in 95.6 weight parts of distilled water was prepared in a separate container and maintained at a temperature of 55° C. When the desired particle size is achieved, the gelatin-liquid crystal emulsion is added slowly to the gum arabic solution. The pH is adjusted to 4.85 and the coacervate is permitted to cool to 27° C. over a period of two and one-quarter hours. The resultant capsules are cooled to below 15° C. and hardened with 0.5 weight parts of a 25 weight percent aqueous solution of glutaraldehyde for 12 to 15 hours. The resulting capsular slurry was then concentrated by decanting excess water.

Upon completion of encapsulation and subsequent concentration of the slurry, approximately one volume part of a 10 weight percent solution of polyvinyl alcohol in water acts as a binder for the coating mixture forming the encapsulated cholesteric liquid crystal layer. The above emulsion coating was then coated on two glass plates previously provided with resistive heating elements which had in turn been overcoated with black paint (Krylon black lacquer) which was dried prior to application of the ELC layer. Upon drying of the ELC layer a transparent top layer overcoat of a solution of 10 weight percent "Acryloid—B-72" dissolved in benzene was cast over the capsule coating to form the substantially smooth, essentially transparent top layer. "Acryloid-B-72" is a methacrylic acid ester copolymeric material characterized by a viscosity of 480 to 640 centipoises in a 40 percent, by weight, solution in toluene at 30° C. The said coating was applied to a wet thickness of approximately 10 mils by a conventional draw down technique. The polymer top layer dried to a clear, substantially smooth, transparent film.

Reflectance measurements were then conducted on both display devices at an angle of incidence of 45° while sensing normal to the plane of the encapsulated liquid crystal film surface. A white magnesium carbonate block was employed for reference. The below table indicates the value observed, and the test was conducted under the same conditions for both test specimens.

| Value | Uncoated | Polymer overcoat |
|---|---|---|
| * Lambda max, colored (nanometers) | 515 | 521 |
| Reflectance percent (versus magnesium carbonate) | 38 | 36 |
| One-half width of reflectance band (nanometers) | 52 | 39 |
| Contrast ratio colored/black | 5 | 22 |

* Wavelength at which the maximum reflection is obtained.

While the essentially transparent, substantially smooth polymer top layer has but little effect on the reflectance maximum of the colored state; a significant and quite visually observable improvement is noted for the contrast ratio. This improvement is believed to be due to elimination of undesirable light scattering from the capsule walls of the encapsulated cholesteric liquid crystals. Decreasing the reflectance band width results in a greater spectral purity and color contrast and hence visual resolution.

EXAMPLE 2 (INVERSE COATING)

A liquid crystal mixture containing 80 weight percent cholesteryl pelargonate, 15 weight percent cholesteryl chloride and 5 weight percent of oleyl cholesteryl carbonate was encapsulated using the same materials and in the same manner specified hereinabove in example 1.

The encapsulated liquid crystal slurry was applied to one major (upper) surface of transparent "Mylar" (polyethylene glycol terephthalate) sheets having thicknesses ranging from approximately 0.5 to 20 mils. The encapsulated liquid crystals were coated uniformly on the upper surface of the "Mylar" substrate from an aqueous dispersion or slurry of 32 weight percent encapsulated liquid crystals, 64.2 weight percent water and 3.8 weight percent of a mixture of polyvinyl alcohol and polyvinyl acetate. The coating weight was 14 to 16 pounds per ream (475,000 square inches). This compares to an average thickness for the ELC layer of 35 to 60 microns.

The coating operation was conducted by screen printing in the following manner: The "Mylar" substrate to be printed upon was laid on a flat surface. A nylon screen, to which a stencilled vinyl back film had been adhered to give the desired printed configuration, mounted on a soft white pine frame, was positioned over the substrate. A supply of capsular ink was then poured on a blocked out region or border of the screen. A neoprene rubber squeegee was used to pull the supply of ink across the screen, at the same time pressing it through the open mesh of the screen. The screen was then lifted from the substrate leaving the capsular ink affixed to the "Mylar."

After the capsular ink had dried, the process was repeated using a 4.4 weight percent black screen process ink to provide the necessary background for the encapsulated liquid crystals attached to the "Mylar." Upon drying of the black opaque background layer, the encapsulated liquid crystal article was inverted thereby allowing a viewer to observe color changes occurring in the encapsulated liquid crystal layer(s) due to changes in temperature (or other equivalent color change inducing forms of energy) when viewed by incident white light through the transparent "Mylar" top layer. The transparent "Mylar" layer, originally serving as substrate for the deposition of the encapsulated liquid crystals, now serves as a brightness enhancing and spectral purity or color intensity improving top layer.

For the specific liquid crystal composition employed in the articles of this example, heating the encapsulated liquid crystal layer to a temperature of 30° to 31° C. results in a red color when illuminated by incident white light at angles of incidence of 0° to 90° and viewed from approximately 90° from the horizontally located liquid crystal layer.

What we claim is:
1. An article of manufacture comprising an encapsulated cholestric liquid crystal layer having an opaque background layer on one surface and a substantially smooth, essentially transparent top layer on the other surface thereof, the interior portion of said top layer being in direct contact with said encapsulated liquid crystal layer throughout substantially the entire extent thereof wherein said encapsulated cholesteric liquid crystal layer is comprised of a profusion of cholesteric liquid crystal capsules in a polymeric binder and the index of refraction of said binder, top layer and the capsule cell wall material ranges from about 1.40 to about 1.70.

2. An article as in claim 1 wherein at least one electrically conductive resistor heater element is in thermally responsive communication with a portion of said encapsulated cholesteric liquid crystals.

3. An article as in claim 1 wherein said capsules have diameters ranging from about 5 to about 500 microns.

4. An article as in claim 1 wherein said top layer is inorganic.

5. An article as in claim 1 wherein said top layer is an organic plastic.

6. An article as in claim 5 wherein said organic plastic is a polyester.

7. An article of manufacture comprising an encapsulated cholesteric liquid crystal layer comprised of a profusion of cholesteric liquid crystal capsules in a binder having an opaque background layer on one surface and a substantially smooth, essentially transparent top layer of substantially the same thickness throughout on the other surface thereof, the interior portion of said top layer being in direct contact with said encapsulated cholesteric liquid crystal layer throughout substantially the entire extent thereof, wherein the index of refraction of said binder, top layer and the capsule cell wall material ranges from about 1.40 to about 1.70.

8. An article as in claim 7 wherein said top layer is glass.

9. An article as in claim 7 wherein said top layer is plastic.

10. An article as in claim 9 wherein said plastic is a polyester.

11. An article as in claim 10 wherein said polyester is polyethylene glycol terephthalate.

12. An article as in claim 9 wherein said plastic is polystyrene.

13. An article of manufacture comprising a substrate having an opaque background layer, an encapsulated cholesteric liquid crystal layer overlying said substrate and a substantially smooth, essentially transparent top layer overlying said encapsulated cholesteric liquid crystal layer, the interior portion of said top layer being in direct contact with said encapsulated cholesteric liquid crystal layer throughout substantially the entire extent thereof wherein said encapsulated cholesteric liquid crystal layer is comprised of a profusion of cholesteric liquid crystal capsules in a polymeric binder and the index of refraction of said binder, top layer and the capsule cell wall material ranges from about 1.40 to about 1.70

14. An article of manufacture as in claim 13 wherein said substrate is paper.

15. An article of manufacture as in claim 13 wherein said substrate is plastic.